US010755295B2

(12) United States Patent
Ilic et al.

(10) Patent No.: US 10,755,295 B2
(45) Date of Patent: Aug. 25, 2020

(54) ADAPTIVE LOAD MANAGEMENT: A SYSTEM FOR INCORPORATING CUSTOMER ELECTRICAL DEMAND INFORMATION FOR DEMAND AND SUPPLY SIDE ENERGY MANAGEMENT

(71) Applicant: Robert Bosch GmbH, Stuttgart (DE)

(72) Inventors: Marija Dragoljub Ilic, Sudbury, MA (US); Jhi Young Joo, Pittsburgh, PA (US); Burton Warren Andrews, Pittsburgh, PA (US); Badri Raghunathan, San Jose, CA (US); Diego Benitez, Pittsburgh, PA (US); Felix Maus, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 948 days.

(21) Appl. No.: 14/878,507

(22) Filed: Oct. 8, 2015

(65) Prior Publication Data
US 2016/0042377 A1 Feb. 11, 2016

Related U.S. Application Data

(62) Division of application No. 12/895,780, filed on Sep. 30, 2010, now abandoned.

(51) Int. Cl.
*G06Q 40/00* (2012.01)
*G06Q 30/02* (2012.01)
(Continued)

(52) U.S. Cl.
CPC ......... *G06Q 30/0206* (2013.01); *G06Q 10/04* (2013.01); *G06Q 30/06* (2013.01);
(Continued)

(58) Field of Classification Search
CPC .................................................. G06Q 30/0206
USPC ....................................................... 705/35–42
See application file for complete search history.

(56) References Cited

U.S. PATENT DOCUMENTS 6,216,956 B1    4/2001   Ehlers
6,681,156 B1    1/2004   Weiss
(Continued)

OTHER PUBLICATIONS

IEEE Xplore / IEEE Conference 2009 ICCAS-SICE pp. 2008-2011 Hybrid modeling with physical and JIT model for building thermal load prediction and optimal energy saving control (Year: 2009).*
(Continued)

*Primary Examiner* — Bruce I Ebersman
*Assistant Examiner* — John A Anderson
(74) *Attorney, Agent, or Firm* — Maginot, Moore & Beck LLP

(57) ABSTRACT

A method for determining an amount of electricity to purchase includes determining electrical power consumption characteristics of an electrical load at an end user of the electricity. A preference of the end user for an output of the electrical load is ascertained. The output varies with a rate of electrical power consumption by the load. A mathematical model is created of an amount of electrical power to be consumed by the load as a function of time and of monetary cost of the electricity. The model is dependent upon the electrical power consumption characteristics of the electrical load and the preference of the end user for an output of the electrical load. An amount of electricity is purchased based on the mathematical model of an amount of electrical power to be consumed by the load, and based on the monetary cost of the electricity.

7 Claims, 8 Drawing Sheets

(51) Int. Cl.
    *G06Q 50/06*    (2012.01)
    *G06Q 40/04*    (2012.01)
    *G06Q 30/06*    (2012.01)
    *G06Q 10/04*    (2012.01)

(52) U.S. Cl.
    CPC ............. *G06Q 40/04* (2013.01); *G06Q 50/06* (2013.01); *Y04S 10/58* (2013.01); *Y04S 10/60* (2013.01); *Y04S 50/10* (2013.01); *Y04S 50/14* (2013.01)

(56) References Cited

U.S. PATENT DOCUMENTS

| | | | |
|---|---|---|---|
| 6,718,213 | B1 | 4/2004 | Enberg |
| 6,853,291 | B1 | 2/2005 | Aisa |
| 7,171,287 | B2 | 1/2007 | Weiss |
| 7,274,975 | B2 | 9/2007 | Miller |
| 9,026,473 | B2 * | 5/2015 | Chassin ................ G06Q 30/08 361/601 |
| 2004/0267408 | A1 | 12/2004 | Kramer |
| 2006/0155423 | A1 | 7/2006 | Budike |
| 2006/0276938 | A1 | 12/2006 | Miller |
| 2007/0276547 | A1 * | 11/2007 | Miller ...................... H02J 3/32 700/295 |
| 2010/0114387 | A1 | 5/2010 | Chassin |
| 2010/0138363 | A1 | 6/2010 | Batterberry |
| 2010/0179704 | A1 | 7/2010 | Ozog |
| 2011/0072293 | A1 | 3/2011 | Mazzaferri et al. |
| 2011/0106328 | A1 * | 5/2011 | Zhou .................... G05B 13/024 700/291 |

OTHER PUBLICATIONS

European Office Action con-esponding to European Patent Application No. 15 181 167.6 (7 pages).

Molina, Gabaldon, Fuentes and Canovas; "Approach to Multivariable Predictive Control Applications in Residential HVAC Direct Load Control"; Dept. of Electrical Engineering, Polytechnic University of Cartegena, 30202 Cartagena (Murcia—Spain); IEEE Power Engineering Society Summer Meeting, 2000; 0-7803-6420-1/00 (c) 2000 IEEE; 6 pages.

Barbose, Goldman and Neenan; "A Survey of Utility Experience with Real Time Pricing"; Lawrence Berkeley National Laboratory, Environmental Energy Technologies Division, University of California, Dec. 2004; LBNL-54238; http://eetd.lbl.gov/ea/EMS/EMS_pubs.html; 127 pages.

Xie, Joo and Ili'C; "Integration of Intermittent Resources with Price-Responsive Loads"; Carnegie Mellon University, Pittsburgh, PA USA; Delft University of Technology, Delft, The Netherlands; Proceedings of North American Power Symposium, 2009; 6 pages.

Kirschen; "Demand-Side View of Electricity Markets"; University of Manchester Institute of Science and Technology, Manchester, U.K.; IEEE Transactions on Power Systems, vol. 18, No. 2, May 2003; 8 pages.

Hammerstrom, Principal Investigator; et al.; "Pacific Northwest GridWiseTM Testbed Demonstration Projects"; PNNL-17167; Part I. Olympic Peninsula Project (157 pages), Part II. Grid FriendlyTM Appliance Project (123 pages); Pacific Northwest National Laboratory, Richland, WA 99352 USA; Oct. 2007.

Ameren Services; "Real-Time Pricing for Ameren Illinois Residential Customers" available online at http://www.ameren.com/Residential/ADC_RTP_Res.asp; 2009; 1 page.

Constantopoulos, Schweppe and Larson; "ESTIA: A Real-Time Consumer Control Scheme for Space Conditioning Usage Under Spot Electricity Pricing"; Computers & Operations Research, vol. 18, Issue 8, 1991, pp. 751-765; Copyright 1992 Published by Elsevier Science Ltd.; 21 pages.

* cited by examiner

ADAPTIVE LOAD MANAGEMENT: A SYSTEM FOR INCORPORATING CUSTOMER ELECTRICAL DEMAND INFORMATION FOR DEMAND AND SUPPLY SIDE ENERGY MANAGEMENT

This application is a Divisional application of U.S. patent application Ser. No. 12/895,780, filed on Sep. 30, 2010, the disclosure of which is incorporated herein by reference in its entirety.

BACKGROUND OF THE INVENTION

1. Field of the Invention

The present invention relates to methods for managing the use of electricity, and, more particularly, to methods for managing the use of electricity by consumers wherein the methods may be at least partially based on values the consumers place on the electricity usage.

2. Description of the Related Art

The price and consumption of energy throughout the world has been increasing dramatically over recent years and is expected to continue along this trend in the years to come. For example, according to the U.S. Department of Energy Annual Energy Outlook, total residential energy consumption is expected to increase by approximately twenty percent from 2007 to 2030 despite efficiency improvements. This is attributed to a number of factors including a projected twenty-four percent increase in the number of households and an approximately seven percent increase in the share of electricity attributed to "other" appliances such as home electronics. Increases in residential electricity consumption are accompanied by a projected 1.4 percent increase per year in commercial electricity consumption. Given these figures, and the fact that residential and commercial buildings comprise the largest energy consumer segment in the U.S., accounting for seventy-two percent of U.S. electricity consumption and forty percent of all energy use in the U.S., the recent push for technological solutions that increase energy awareness and efficiency are of no surprise.

The smart electric grid has been a vision for quite some time now, and rising energy prices and climate change have recently strengthened the urgency of this topic. Mandated by the U.S. Energy Independence and Security Act, The National Institute of Standards and Technology (NIST) is stewarding the development of a standards framework to accelerate the deployment of the smart grid. Buildings constitute a key part of the smart grid picture on the demand side; residential and commercial buildings comprise the largest energy consumer segment in the United States. Together, residential and commercial buildings account for 40% of all energy use in the U.S. Buildings account for 72% of U.S. electricity consumption and 36% of natural gas consumption. Without action, U.S. energy consumption is projected to grow about 25% over the next two decades, and buildings are expected to play a large part in that growth.

To address the above problems, electric power systems around the globe are faced with needs for fundamental changes, which have brought about the concept of smart grids. The ongoing changes of the system have called for demand to become smarter as well in ways that comply better with the volatility of the supply side arising from increased penetration of intermittent and distributed resources. The curtailment of the peak demands has also become important to reduce the needs for additional electricity generation capacity. Driven by government mandated spending, there are huge commercial initiatives to deploy Advanced Metering Infrastructure (AMI) and other technologies for the smart grid. Current smart grid standardization activities are attempting to address the issues of protocols and information models needed to enable decision making throughout the grid. These protocols need to bring values captured from the smart grid technologies to the complete ecosystem, i.e., customers, Load Serving Entities (LSEs), utilities, and society as a whole.

Until very recently, there has been an active skepticism concerning benefits from retail competition. To the contrary, many years ago a vision was put forward that if all customers, small and large, responded to the changing system conditions locally, the system would in a homeostatic way keep itself in a healthy sustainable equilibrium. A concept was put forward that the law of large numbers will result in significant economic savings provided even the smallest users respond. These concepts have never materialized for a variety of reasons, perhaps the key reason being a lack of adequate incentives to encourage users to respond.

The past decade has seen a revival of electricity customer choice. Most recently, it has become accepted that active demand side response might be the key to overall energy efficiency and sustainability. The role of timely demand side response has become even more recognized as large-scale penetration of intermittent electricity generation is planned. Consequently, there has been significant research on thermal modeling of buildings, non-intrusive load monitoring, economic characterization of demand response, and the like. There have been renewed efforts to serve large customers efficiently. However, hardly any frameworks have attempted to systematically integrate large-scale responses from, and preferences of, the individual building users in residential and commercial buildings. It is also known for buildings including residential, commercial and public buildings to make use of distributed generation in order to provide at least a portion of the electricity that they consume. Distributed generation, which is also referred to as distributed energy, decentralized energy, decentralized generation, embedded generation, dispersed generation or on-site generation, involves the generation of electricity from many small energy sources. Such small energy sources may include renewable energy sources such as sunlight, wind and geothermal, but may also include non-renewable energy sources such as natural gas or propane powered generators. Distributed generation systems are small-scale electricity generators (typically in the range of 3 kW to 10,000 kW) used to provide an alternative to or an enhancement of the traditional electric power system.

Distributed generation may reduce the amount of energy lost in transmitting electricity because the electricity is generated very near the location where the electricity is used, perhaps even in the same building. Thus, the size and number of power lines that must be constructed in also reduced. Distributed generation systems may include technologies including combined heat power (CHP) and photovoltaic (PV) systems.

Combined heat power (CHP), which is also referred to as cogeneration, may include the use of a heat engine or a power station to simultaneously generate both electricity and useful heat. In addition to small-scale natural gas or propane powered generators for residential use, cogeneration plants are commonly utilized in district heating systems of hospitals, prisons, and industrial facilities with large heating needs. CHP may include natural gas or propane powered electricity generators that are disposed in the basement of a residence. Such generators may typically be used to provide electricity primarily during time periods of peak demand, when the cost of electricity may be the highest. In addition to the electricity produced by these generators, excess heat produced by these generators may be used in space heating within the same residence.

Photovoltaics (PV) is a method of generating electrical power by converting solar radiation into direct current electricity using semiconductors that exhibit the photovoltaic effect. Photovoltaic power generation may employ solar panels comprising a number of cells containing photovoltaic material. In contrast to the CHP generators described above, solar panels are used, and may only be used, whenever the sun is shining.

What is neither disclosed nor suggested in the art is a system and method for managing the use and generation of electricity by consumers that takes advantage of voluntary behaviors and preferences of the consumers.

SUMMARY OF THE INVENTION

The present invention may provide a system and method for managing the use and generation of electricity at multiple levels of the electrical infrastructure while explicitly accounting for the value that consumers place on the supply of electricity. The system may include two components that may operate independently or in a joint manner. The first component is a local Adaptive Load Management (ALM) module at the level of the consumer that may manage electricity use decisions for a building operator. The second component is an ALM module at the level of an electricity aggregator such as a Load Serving Entity (LSE), Power Marketer, Virtual Power Plant operator (VPP) or Demand Response Operator (DRO) that may manage electricity resource allocation, pricing, and/or market decisions. The ALM module at the local consumer level may take, as input, models of electrical loads and/or distributed generators in the building. These models of electrical loads and/or distributed generators may be automatically obtained through sensing, electricity pricing information, and customer preference information. The ALM module at the local consumer level may yield an optimal electricity purchasing strategy for the building operator as well as a prediction of electricity consumption. The ALM module at the aggregator level may take as input the local purchasing strategies, viewed as demand functions, along with pricing information from the wholesale electricity market, from bilateral supply contracts or from distributed generation at the consumer level, to arrive at an optimal electric grid operation and energy purchase strategy. The optimal electric grid operation and energy purchase strategy may include, for example, customer pricing, plans for utilization of distributed energy storage, lists of resources, bulk electricity buy decisionpoints, etc. While each of these ALM modules may be used independently, a system employing ALM modules at each of at least two levels that communicate, as enabled by smart meters and/or smart grid IT systems, may enable achievement of the many goals of next generation electrical infrastructures by coupling optimal decision making with customer value.

Described above is a first of two ALM steps, namely, obtaining the user preferences and purchasing energy accordingly. In a second ALM step, the loads and/or distributed generators are controlled according to the amount of energy that has been purchased.

The process of identifying user preferences and purchasing corresponding amounts of energy may be performed repeatedly and iteratively as the time of energy delivery approaches. By doing so, the predictions of electricity prices as well as other environment variables (e.g., ambient temperature, building electricity usage) can be refined for the short-term steps. Thus, the more recent calculations may produce more accurate predictions for the steps in the near future. Different market mechanisms that have different time scales (e.g., one day ahead vs. real-time markets) can be addressed by utilizing each of the market mechanisms in long term calculations and/or short term calculations as appropriate.

As described above, the invention applies the process of characterizing the load and/or distributed generators, modeling and aggregating the models, and purchasing an amount of electricity from several electricity markets through, for example, long-term bilateral contracts, day-ahead energy procurement, balancing capacity markets, and/or real-time markets. Re-applying this process may lead to increasingly accurate predictions as the time of energy delivery gets closer. The distributed loads and/or generators can thus react to the overall system state. In this setup, the ALM may implement a closed-loop control of distributed loads and/or generators with respect to the state of the power supply system.

Determining the electricity consumption based on the end user preferences can include the use of thermal models. Such thermal models may describe the thermal behavior of a building or of a thermal storage device.

The ALM system can be used to control the connected devices, e.g., by updating the first pricing prediction with newer and more accurate price profiles, and may even do so multiple times. This may provide the aggregator with a quickly responding system, closing the loop between the aggregator and the connected devices.

There may be various benefits for controlling the connected devices. First, the devices may be adjusted in order to minimize the real-time deviation from the previous energy purchase. That is, the electricity consumption of the devices may be adjusted in order to more closely match an amount of electricity that is purchased and available.

Second, the devices may be adjusted to minimize the cost of the aggregator. The cost of the aggregator may include long-term energy procurement at variable prices, so loadshifting (e.g., re-scheduling loads from times of high prices to times of lower prices) or peak-shaving (e.g., reducing the peak demand) can be achieved.

Third, the devices may be adjusted according to the system real-time deviation. For example, the load may be reduced if the electricity system is lacking of generation, and the load may be increased if too much generation has been procured. This is especially useful with respect to volatile/ fluctuating energy sources, e.g., generation from wind or solar. Thus, the ALM can help to integrate higher fractions of renewable energy sources into the supply system.

Fourth, the devices may be adjusted in order to participate in power system ancillary services, such as balancing energy provision. Thus, the load may be reduced if energy is to be transferred to another load, and the load may be increased if energy is to be procured from another load.

The ALM system may be most effectively used with loads that have a certain degree of flexibility in the time and magnitude of their energy consumption, e.g., HVAC devices and electric vehicles. With regard to heating or air conditioning (HVAC) devices, hot water tanks or the building structure itself can be considered thermal storages that may provide a certain degree of flexibility in the time and magnitude of electricity consumption. The heating system can pre-heat a water tank of the building in order to reduce electricity consumption at other times. The ALM system may use thermal models of water tanks and/or buildings in order to determine the energy consumption characteristics.

With regard to electric vehicle or plug-in hybrid electric vehicle charging, the boundary condition may be for the car to be in a charged state by a certain time in the morning, but the actual time period(s) for charging can be flexibly determined sometime during the previous night. The ALM system may use models describing the electric vehicle battery in order to determine the consumption characteristics.

The invention comprises, in one form thereof, a method for determining an amount of electricity to purchase, including determining electrical power consumption characteristics of an electrical load at an end user of the electricity. A preference of the end user for an output of the electrical load is ascertained. The output varies with a rate of electrical power consumption by the load. A mathematical model is created of an amount of electrical power to be consumed by the load as a function of time and of monetary cost of the electricity. The model is dependent upon the electrical power consumption characteristics of the electrical load and the preference of the end user for an output of the electrical load. An amount of electricity is purchased based on the mathematical model of an amount of electrical power to be consumed by the load, and based on the monetary cost of the electricity. The local load may then be controlled according to the purchased energy and/or the preferences retrieved in a previous step.

The invention comprises, in another form thereof, a method for distributing electricity among a plurality of end users, including the following computer-implemented steps. Electrical energy consumption characteristics of each of a plurality of electrical loads are determined Each of the electrical loads is used by a corresponding one of the end users of the electricity. For each of the electrical loads, a preference of the corresponding end user for an output of the electrical loads is ascertained. The output varies with an amount of electrical energy consumed by the load. A mathematical model of an amount of electrical energy to be consumed by each of the electrical loads is created as a function of time and of monetary cost of the electrical energy. Each of the models is dependent upon the electrical energy consumption characteristics of the electrical load and the preference of the end user for an output of the electrical load. The mathematical models of electrical energy consumption are aggregated together. A bid is prepared for an amount of electrical energy to be delivered during a specified period of time. The bid is prepared based upon the aggregation of the mathematical models of electrical energy consumption, as well as upon a known current market price and/or a future expected market price of the electrical energy. The bid is submitted to a supplier of electrical energy. The local load may then be controlled according to the purchased energy and/or the preferences retrieved in a previous step.

The invention comprises, in yet another form thereof, an adaptive load management system including a plurality of load modules. Each of the load modules is disposed in a respective building and determines electrical energy consumption characteristics of each of a plurality of electrical loads associated with the respective building. For each of the corresponding electrical loads, each of the load modules ascertains a preference of a corresponding end user of the load for an output of the electrical load. The output varies with an amount of electrical energy consumed by the load. Each of the load modules creates a mathematical model of an amount of electrical energy to be consumed by each of the corresponding electrical loads as a function of time and of monetary cost of the electrical energy. Each of the models is dependent upon the electrical energy consumption characteristics of the electrical load and the preference of the corresponding end user for an output of the electrical load. An aggregator module is communicatively coupled to each of the load modules. The aggregator module receives price data regarding a market for electricity, and receives the mathematical models from each of the electrical loads. The aggregator module purchases an amount of electrical energy to be delivered to the electrical loads during a specified period of time. The amount of energy being purchased is based on the mathematical models of electrical energy consumption, as well as a known current market price and/or a future expected market price of the electrical energy.

The invention comprises, in a further form thereof, a method for determining an amount of electricity to purchase, including determining electrical power consumption characteristics of an electrical load at an end user of the electricity. A preference of the end user for an output of the electrical load is ascertained. The output varies with a rate of electrical power consumption by the load. A mathematical model is created of an amount of electrical power to be consumed by the load as a function of time and of monetary cost of the electricity. The model is dependent upon the electrical power consumption characteristics of the electrical load and the preference of the end user for an output of the electrical load. An amount of electricity to be delivered by an electricity provider at a future point in time is reserved. The amount of electricity that is reserved is based on the mathematical model of an amount of electrical power to be consumed by the load, and the monetary cost of the electricity. The determining, ascertaining, creating and reserving steps are repeated a plurality of times before the future point in time. Delivery of the most recently reserved amount of electricity is received at the future point in time.

An advantage of the present invention is that it provides efficient allocation of electricity resources based on consumer preferences and the consumers' willingness to pay for different levels of electricity during different time periods.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
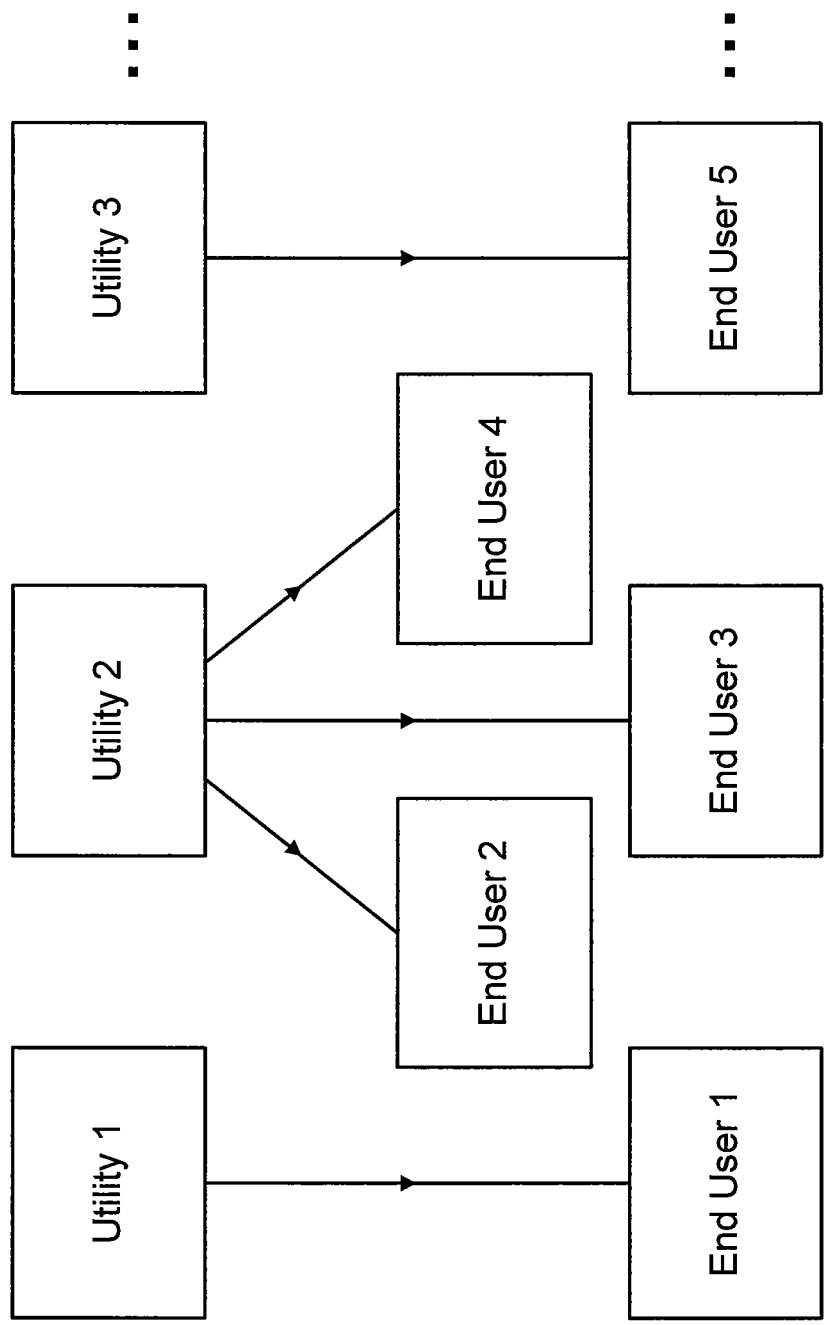
FIG. 1 is a block diagram of information flow in a direct load control scheme of the prior art.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

While the role that demand is expected to play in the new changing electricity industry is larger than ever, the information flow from demand to the system has been very limited: the system operator usually has the whole aggregated demand prediction based on the historical data and the weather conditions. Various demand response programs under experiment fail to enable interactive online adaptation by the users in response to price changes. Instead, some form of direct load control in a top-down manner by the system/market operator is in place, as illustrated in FIG. 1.

In contrast to known operations, true system equilibrium may be achieved by the present invention as a result of interactions between end users, power producers, load serving entities (or utilities) and the system/market operator. It is conceptually difficult to arrive at this equilibrium unilaterally without constantly and bi-directionally exchanging information between the participants within the electric power system. In other words, the system/market operator may not be able to clear the market without the full knowledge of the demand by the end-users and the supply characteristics of the power producers. Similarly, realistic demand and supply functions may not be arrived at without active adaptation by the demand and supply to the expected electricity prices. Therefore, a multi-layered, multi-directional adaptive system may be called for in order to enable the necessary online information exchange. Such a system may be referred to herein as an adaptive load management (ALM) system.

The exchange of information between market participating units and the operator is, of course, not new. However, prior to the present invention, there has been no development of technology that obtains and leverages needed information from the demand side, especially in the case of individual end-users. In the prior art, the demand is usually taken as an exogenous factor that the supply has to meet. Even the most recently developed demand-side management programs either control demand in a centralized manner (e.g., direct load control) or take price signals as a factor for individual control. System demand is basically taken as inelastic and unresponsive to the price when generation bids are cleared. This is because the demand is considered to be by and large inelastic to the price in the short-term, and/or because there is little information known about the price elasticity of electricity demand. The lack of information about the price elasticity of electricity demand may be due to the limited experience and data regarding the response of demand to varying prices.

The present invention addresses these above-described shortcomings of the prior art via the employment of an ALM system that may have two components. The first component is a module that resides at the level of the individual consumer and optimally obtains each end user's economic value with respect to the price of electricity without violating their comfort level. To achieve this, sensing and embedded intelligence is used to capture models of relevant electrical loads in the building and to translate the comfort and physical specifications at each end user's premises into a demand function for each pricing interval. As part of the second component of the system, these demand functions may be aggregated at a higher layer by an entity such as a load aggregator. The aggregation of the demand functions may be sent to the market and may be used in aggregator decision making strategies.

Some of the potential benefits and possible implementations of the present invention are summarized below. First, the inventive system may include a software module that resides at the local building level (which hereinafter may be referred to as a "local module"). This local module may take as input (1) a model of the electrical loads and/or distributed generators in the building; (2) information regarding the price of electricity for an upcoming period of time (e.g., 24 hours); and (3) customer preference information such as temperature preferences or minimum energy consumption needs. These inputs may be used by an optimization algorithm in the software which determines the optimal demand function for the user (e.g., how much electricity to purchase from the electricity provider for each of a number of upcoming time intervals). For instance, the demand function may specify, for each hour of the upcoming day, how much energy should be purchased at a given price.

Second, the local module may be connected to a smart meter which receives electricity pricing information from the utility. In addition, the demand function computed by the local module may be communicated to the utility company through a device such as a smart meter in order to make demand information available for utilities to incorporate into their operation strategies.

Third, the local module may include or communicate with a user interaction device that obtains preference information directly from the household user. For instance, a remote handheld device with connectivity to the local module (e.g., via wireless communication, power line communication, direct connection, etc.) may prompt the user for his preferences (e.g., temperature comfort bounds, energy cost budget, etc.), or for a list of the typical types of devices that are used in the building. Other possible manifestations of such a user interaction device may include a thermostat interface, smart phone, or internet portal.

Fourth, the model of the electrical loads used by the local module may be obtained via the user interaction device by, for example, the user specifying the type of load or loads used in the house. For instance, the user may specify the model of the heating system used in the building. The load model may comprise in its entirety only a single device (e.g., a heating system) or a multitude of devices that make up the entire building load.

Fifth, the electrical load model used by the local module may be obtained automatically through an intelligent sensing system in the building that is connected to the local module. This intelligent sensing system may include numerous types of sensors distributed throughout the building, such as motion sensors, ambient sensors (temperature, humidity, lighting, etc.), or sensors to measure electricity consumption. Electricity consumption sensors may be directly connected to individual loads in the building (e.g., to detect individual device consumption) or may measure aggregated electrical information, such as from the main electrical feed to the building or at the circuit level. Individual appliance use may be obtained from aggregate sensor information via a non-intrusive load monitoring system. The intelligent sensing system may process all of the sensor data to thereby ascertain patterns in electricity use to construct a model of electricity consumption behavior for the building which can be input to the local module.

Figure 2:
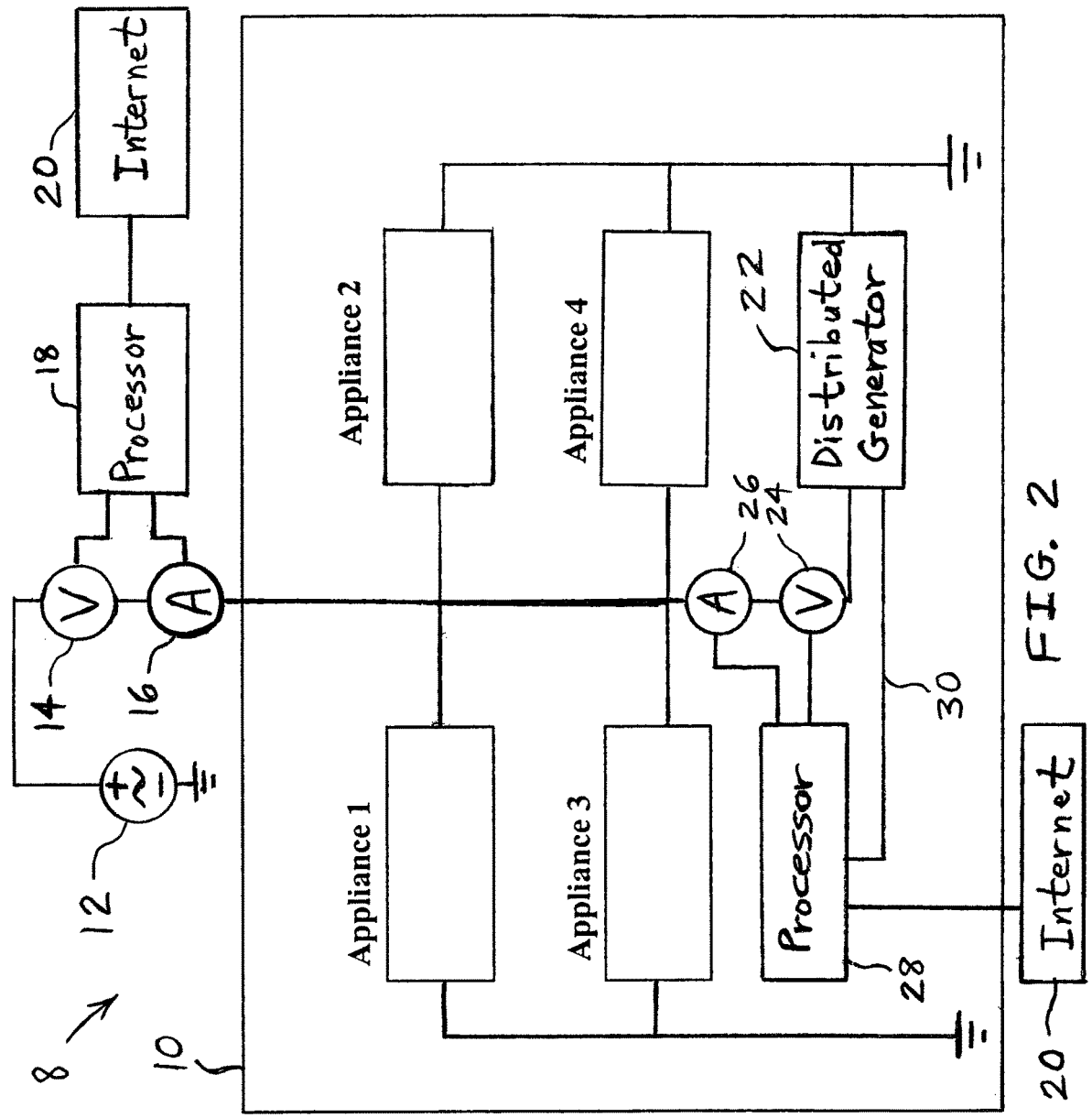
FIG. 2 is a block diagram of one embodiment of a non-intrusive load monitoring system of the present invention.

Shown in FIG. 2 is one embodiment of such a non-intrusive load monitoring system 8 of the present invention including appliances 1-4 disposed within a building 10. Appliances 1-4 are powered by a voltage source 12, which may be power lines or an electrical grid provided by a public utility company. Disposed in association with the main power line leading into building 12 are a voltage meter 14 and a current meter 16. Voltage meter 14 may continuously measure the voltage being supplied to building 10. Current meter 16 may continuously measure the electrical current flowing into building 10. The voltage and current readings from meters 14, 16 may be transmitted to an electrical processor 18, such as a microprocessor, which may include memory. Although meters 14, 16 and processor 18 are shown as being disposed outside of building 10, any or all of these components may be disposed inside building 10. Processor 18 may be communicatively coupled to a local or remote central database using any wired or wireless communication protocol such as Wi-Fi, Bluetooth, power line communication, the Internet, etc. 20, from which processor 18 may receive mathematical models of the electrical characteristics of appliances 1-4 or other information about appliances 1-4.

In addition, appliances 1-4 may also be powered by an optional distributed generator 22, which may be in the form of combined heat and power (CHP) or a photovoltaic (PV) system, for example, that is located on the premises of building 10. Disposed in association with the power line connecting distributed generator 22 with appliances 1-4 are a voltage meter 24 and a current meter 26. Although meters 14, 16 are shown in the simplified view of FIG. 2 as being directly connected to meters 24, 26, it will be appreciated by those skilled in the art that meters 14, 16 may be electrically isolated from meters 24, 26 such that the two sides do not share a common node with a shared voltage. Voltage meter 24 may continuously measure the voltage being supplied to building 10 by distributed generator 22. Current meter 26 may continuously measure the electrical current flowing into building 10 from distributed generator 22. The voltage and current readings from meters 24, 26 may be transmitted to an electrical processor 28, such as a microprocessor, which may include memory. Processor 28 may be communicatively coupled to processor 18 using any wired or wireless communication protocol such as Wi-Fi, Bluetooth, power line communication, the Internet, etc. 20. Processor 18 may inform processor 28 of the current or future costs of externally procured electricity, and processor 28 may inform processor 18 of the present power generating capacity of distributed generator 22. One or both of processors 18, 28 may determine, based on the electricity cost and the power generating capacity of generator 22, how much external electricity should be bought, and how much power should be generated by generator 22, and when such power should be generated. Based on this determination, processor 28 may control the operation of generator 22 via line 30. However, in the case of generator 22 being a photovoltaic device, control of the operation of the photovoltaic device may not be called for. In the case of generator 22 being a combined heat and power device, any excess heat produced by generator 22 may be used for space heating within building 10.

Processors 18, 28 may take into account the excess heat produced by generator 22 and used for space heating and correspondingly reduce the forecasted electricity needs due to the space heating. More particularly, processors 18, 28 may have a table stored in memory that specifies an amount of electrical energy that would be needed to achieve the same level of space heating as produced by the excess heat of generator 22. This amount of equivalent electrical energy may be subtracted from the forecasted electricity needs of building 10. Although only one distributed generator 22 is shown in association with building 10, it is to be understood that any number of distributed generators may be associated with the building.

Sixth, the local module may use a variety of different optimization algorithms to determine, based on the price of electricity, the model of the electrical load and/or distributed generators, the customer preferences, and the optimal demand function for the building for each of a number of upcoming time intervals.

Seventh, the local module may include, or be connected to, any of a number of different types of actuation devices that allow for implementation of the optimal decision making functions computed by the local module. An example of such an actuation device may be an arbitrator device at the main electrical feed of the building that governs how much electricity is to be purchased from the utility for use within the building. Other possibilities include a device connected to the heating system to govern operation of the heating system as allowed by the optimal policy computed by the local module.

Eighth, the local module software may reside on a variety of different computing platforms in the building. This may include a computer, a device with embedded software (e.g., connected to the main electrical panel or sitting elsewhere in the building), the smart meter itself, or a remote server.

Ninth, the system may include a software module at the level of the electricity aggregator (which hereinafter may be referred to as the "aggregator module") such as an LSE or VPP which takes as input (1) the demand functions computed from each of the local modules; (2) electricity price information from the wholesale market; and (3) resource availability of the aggregator (e.g., available generation and storage) and associated costs.

Tenth, the aggregator module may use any of a variety of optimization algorithms that compute business decisions for the aggregator. Such business decisions may include the price of electricity to set for each of a number of upcoming time intervals, or how much of which source of electricity generation to use at which time interval.

Eleventh, the aggregator module may be a standalone device that makes decisions automatically and integrates with other systems used by the aggregator to automatically implement business decisions. Alternatively, the aggregator module may be a module that works interactively with aggregator operators 'in the loop' to provide assistance with business decisions. For example, the aggregator module may be used as an option evaluation or simulation tool to project or predict effects of policy implementation.

Twelfth, the aggregator module and the local module may exist as separate, independent entities that accept only the basic inputs and compute the basic outputs as described in the above possible implementations.

Thirteenth, the aggregator and local modules may be deployed by a common provider, in which case additional functionality may be included. For instance, the local modules may provide to the aggregator module information pertaining to projected load forecasts from the electrical load models and stochastic characterizations of projected demand functions. Such information may then be used by the aggregator module to incorporate risk management into business decision making.

Figure 3:
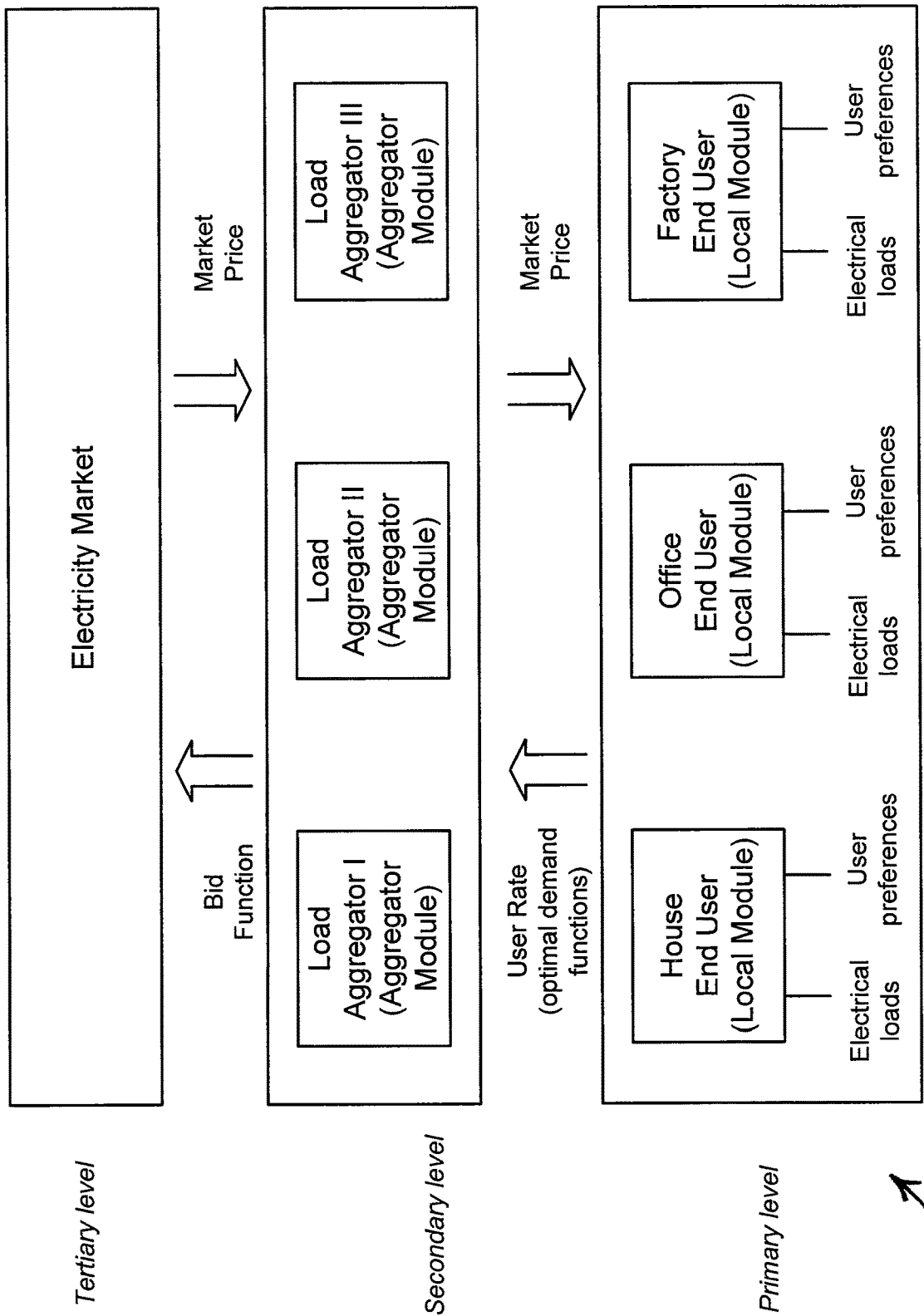
FIG. 3 is a block diagram of one embodiment of an adaptive load management system of the present invention.

One embodiment of an adaptive load management (ALM) system 30 of the present invention is illustrated in FIG. 3. As shown, there may be three levels of the electrical infrastructure: the primary level includes the end users of electricity (e.g., residential and commercial buildings); the secondary level includes local aggregators of electricity such as Load Serving Entities (LSEs) and/or Virtual Power Plant Operators (VPPs); and the tertiary level is the wholesale electricity market. ALM 30 may be implemented via optimal decision making mechanisms at the primary and secondary levels. More specifically, the local modules at the primary level may take pricing information as input from the aggregators at the secondary level, as well as local inputs pertaining to electrical loads of the building, preferences of the user, and possibly power generating capabilities of a local distributed generator, and derive optimal demand functions therefrom. These demand functions may specify how much electricity the customer is willing to purchase at each of a range of particular cost rates at particular times of day.

One or more load aggregators at the secondary level may employ an Aggregator Module that may take the demand functions from the customers as input along with wholesale electricity market prices to arrive at an optimal business strategy for determining future customer prices and resource allocation decisions. More details of the modules at the primary and secondary levels are described hereinbelow.

The Local Module at the primary level may determine, for each customer, a demand function (e.g., customer demand for electricity as a function of cost and time of day) that truly reflects the value that that particular user places on the electricity commodity. As such, the Local Module may account for the specific preferences and needs of the user.

Although other possible implementations as described above are within the scope of the invention, a Local Module may be an embedded device, and may be installed at the main electrical feed of the building. The Local Module may be connected to a smart meter which receives electricity pricing information from the utility company. The Local Module may also be connected to several sensing devices distributed throughout the building, such as motion sensors and electricity monitoring or measurement sensors. The Local Module may further be connected to any distributed generator(s) associated with the building, as well as to any processor(s) in communication with the distributed generator(s).

Figure 4:
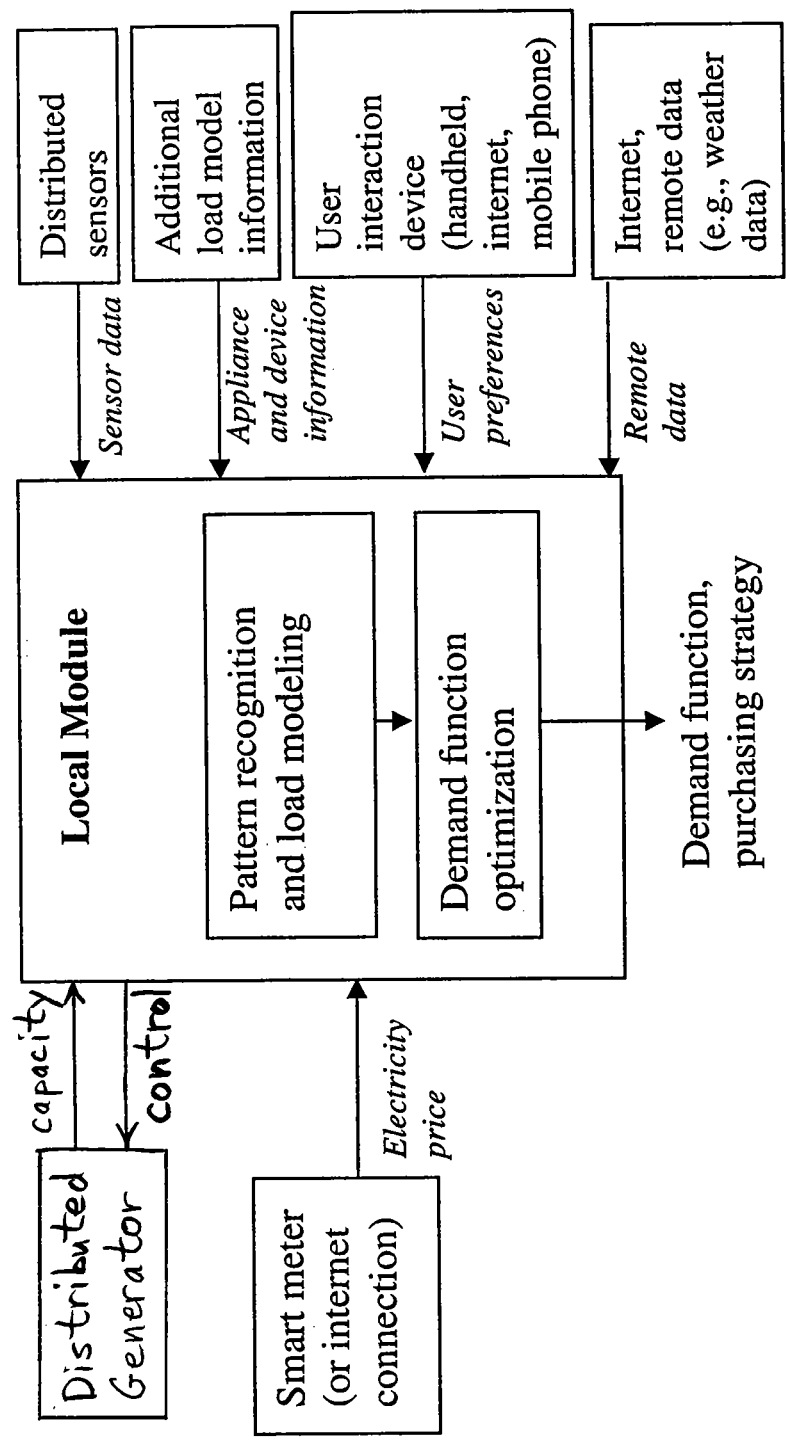
FIG. 4 is a block diagram of one embodiment of a local module of the adaptive load management system of FIG. 3 along with various sources of input to the local module.

FIG. 4 illustrates a possible implementation of a Local Module of adaptive load management system 30 of FIG. 3.

A smart meter or other communication source (e.g., internet connection) may provide electricity price information to the Local Module.

Distributed sensors may capture data regarding the building environment and provide this sensor data information to the Local Module to aid in constructing a model of the entire building load. One example of data regarding the building environment is human occupancy information from motion sensors. Such human occupancy information may be used by the Local Module in learning and constructing a model of the building occupants' presence and absence patterns. Such a model of the ingress of people into the building and egress of people out of the building may be used by the Local Module in making decisions pertaining to when to purchase electricity for heating and cooling needs. For example, upon recognizing a consistent pattern of there being an unusually high number of people present in the building beginning at 6 p.m. on Monday nights, the Local Module may recognize that an increased level of electricity will need to be purchased on future Monday nights beginning at 6 p.m.

As another example of the Local Module using sensor data to decide how much electricity to purchase and when, data from motion sensors, indoor thermometers and/or electricity consumption meters may be used to establish a pattern that a convention center requires less electricity for heating when a relatively large number of people are present in the convention center and providing body heat. Thus, an amount of heat that is purchased for use in the next few hours for heating may be inversely related to the number of people that are sensed entering the convention center, such as by turnstiles and/or motion sensors. In one embodiment, motion sensors that are conventionally provided on toilets and/or urinals may provide occupancy data that is used to create an electricity demand model.

As yet another example of the Local Module using sensor data to create an electricity demand model, sensors may collect electricity consumption data from individual appliances and devices, or may collect data regarding the total electricity consumption of the building. Such electricity consumption data may be used by the Local Module in constructing a model of the typical electricity consumption behavior of the building occupants. Such a load profile may provide valuable information to the Local Module to determine, for instance, times of peak consumption so that demand can reflect such preferences. Additional load information such as more detailed models of appliances and devices in the building (e.g., an HVAC system) may be obtained from other sources such as an internet connection to an appliance manufacturer. Additional remote data may also be input to the electricity demand model, such as weather forecast information obtained from the internet.

The weather forecast information may also be used by the Local Module to forecast the power generating capacity of a distributed generator in the form of solar panels. The Local Module may then subtract this local power generation forecast from the local demand function to arrive at a level of power that needs to be purchased. A processor associated with the distributed generator may measure the current actual power output of the distributed generator, and share this capacity information with the Local Module. To the extent that the power output of the distributed generator can be controlled, the Local Module may control the operation of the distributed generator in order to match the generator's power output with the power needs forecasted by the Local Module.

While the patterns learned from the available sensor data may provide some indication of customer preference as reflected in the customer's behavioral patterns, additional preference information may be obtained directly from the user via a user interaction device. For instance, the user may input his preferences via an internet portal on a personal computer, a smart phone, a user interface on a thermostat, or a separate handheld device somewhere in the building. Examples of relevant user preference information may be preferred maximum and minimum temperatures.

The Local Module may take the above-described inputs along with market pricing information from the utility, and derive relevant load and/or generator models through pattern detection algorithms, for example, by using the available sensor data. The Local Module may compute an optimal demand function that minimizes the cost of electricity to be purchased by the consumer without sacrificing or deviating from the consumer's comfort temperature bounds which are provided by the consumer or derived from data. One simple example of such an optimization is a scenario wherein the load model is for a cooling system for a building, and the customer preferences are the maximum and minimum temperature set-points. The optimization problem may be where $T_i[k+1]=A_i T_i[k]$ subject to $T_i^{min} \leq T_i[h] \leq T_i^{max}$ for all h. Here, T is the temperature inside the building, A and B parameterize a linear system model of the temperature dynamics, x is energy consumed, h is the price of electricity, and k is a time interval (e.g., hours).

The result of this optimization is a function x(h) that specifies the amount of energy the customer is willing to purchase at price h for a particular hour of the day. Such an optimization may be readily extended to other load models that are derived from the sensing information and corresponding preferences. The temperature dynamics may be replaced with dynamics of the load behavior such as dynamics characterizing occupant consumption patterns or patterns of human presence in the building and absence from the building. Such dynamics may be time dependent to reflect behavioral dependencies on the time of day.

The resulting optimal demand function can be used in several ways. For example, the resulting optimal demand function can be communicated back to entities at the secondary level, provided to the user as a feedback mechanism to enable the user to make better energy management decisions, or input to building control system actuators that may control appliances and devices in the building so as to satisfy the demand function. One example may be a heating system that is controlled so as to use only as much energy as specified by the demand function.

The Aggregator Module at the secondary level may obtain information from the primary level consumers regarding their electrical load demands and the consumers' willingness to pay for their electrical load demands. The Aggregator Module may further make decisions for upcoming electricity price points and use of electricity resources. A diagram of a possible architecture for the Aggregator Module is shown in FIG. 5.

The Aggregator Module may accept the various demand functions from the primary level as input. These demand functions may be a product of the Local Modules or from an assumed inelastic demand (or other sources or assumptions) if Local Modules are not present. These demand functions may be aggregated together to formulate a complete picture of the local market for electricity. Other inputs may include information about other available energy generation resources such as renewable energy sources (e.g., solar, wind, etc.), energy storage systems, micro combined heat and power (micro-CHPs), biomass, and natural gas turbines as well as associated costs and prices. Other inputs may include business strategies such as risk tolerance levels. These inputs may be fed into an optimization function that decides, based on the wholesale electricity market price, how much energy to allocate from which generation sources and at which price on the local market.

Figure 5:
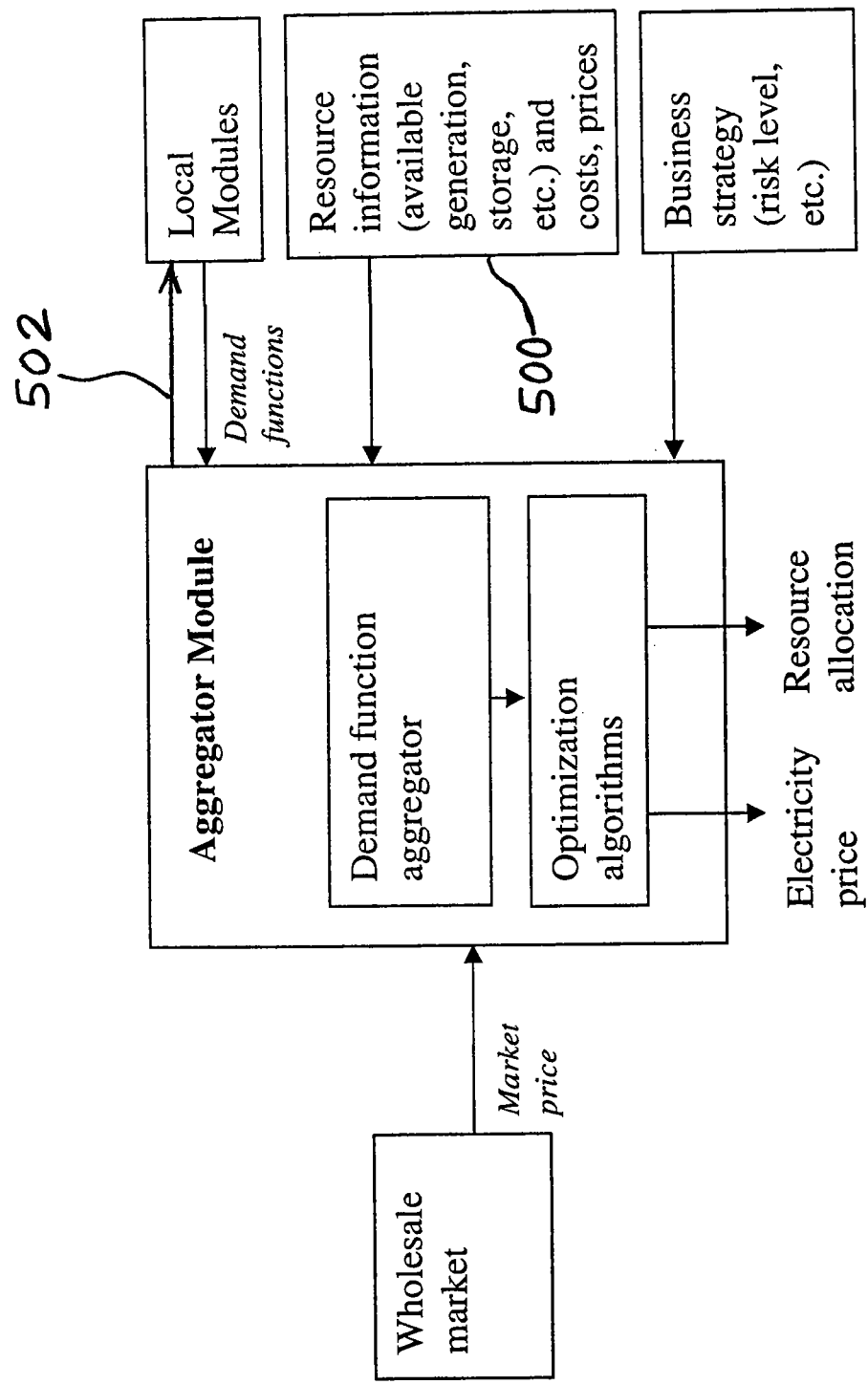
FIG. 5 is a block diagram of one embodiment of an aggregator module of the adaptive load management system of FIG. 3 along with various sources of input to the aggregator module.

In the embodiment of FIG. 5, the resource information 500 may provide information regarding the current availability of energy from volatile/fluctuating electricity sources such as solar and wind. In response, the aggregator module outputs real time energy consumption commands 502 to the local modules which instruct the local modules how much external energy is available to consume. The energy consumption commands 502 may be at least partially based upon the current rate of electricity production by solar and wind, as well as the amount of energy currently available in storage devices. The energy consumption commands 502 may be particularly useful in embodiments in which solar/wind production and the storage devices are the only available sources of electricity (i.e., electricity is not available on the wholesale or retail market, or is available but prohibitively expensive).

A water heater or building HVAC system may be considered a form of thermal energy storage, which may be more efficient than storing the energy in electrical form and then converting the electrical energy to thermal energy when the thermal energy is actually needed. Thus, any available electrical energy that is locally produced by wind and/or solar energy may be immediately used by the water heater and/or building HVAC system. The water heater and/or HVAC system then converts the electrical energy into thermal energy in the form of heat (or possibly in the form of a drop in building temperature in the case of an air conditioning HVAC system). Depending upon how well the water heater and/or building is thermally insulated, the water heater and/or building may store the thermal energy for a period of time until it is actually needed. For example, solar energy collected during the day may be thermally stored in the water heater for use in the evening when residents return to their homes and begin using hot water. As another example, wind energy collected at night (by another form of distributed generator) may be thermally stored in the thermal mass of an office building as a result of HVAC system operation. Thus, the HVAC system does not need to use as much electricity that must be bought on the open market in order to achieve a desired building temperature when office workers return to their offices later in the morning.

While the Aggregator Module may operate independently of the existence of Local Modules, additional benefits may be obtained if modules at both primary and secondary levels are in place. For instance, if a single company or partnering company installs systems at multiple levels, it may be beneficial to have both an aggregator module and a local module. In this case, the value of electricity in the market may be truly obtained from the primary levels and therefore the value of electricity may be reflected in the market price as information flows across the primary and secondary levels. Furthermore, additional input information that may be obtained from the Local Modules such as stochastic load projections, may enable secondary level operators to manage risk in a effective way.

Figure 6:
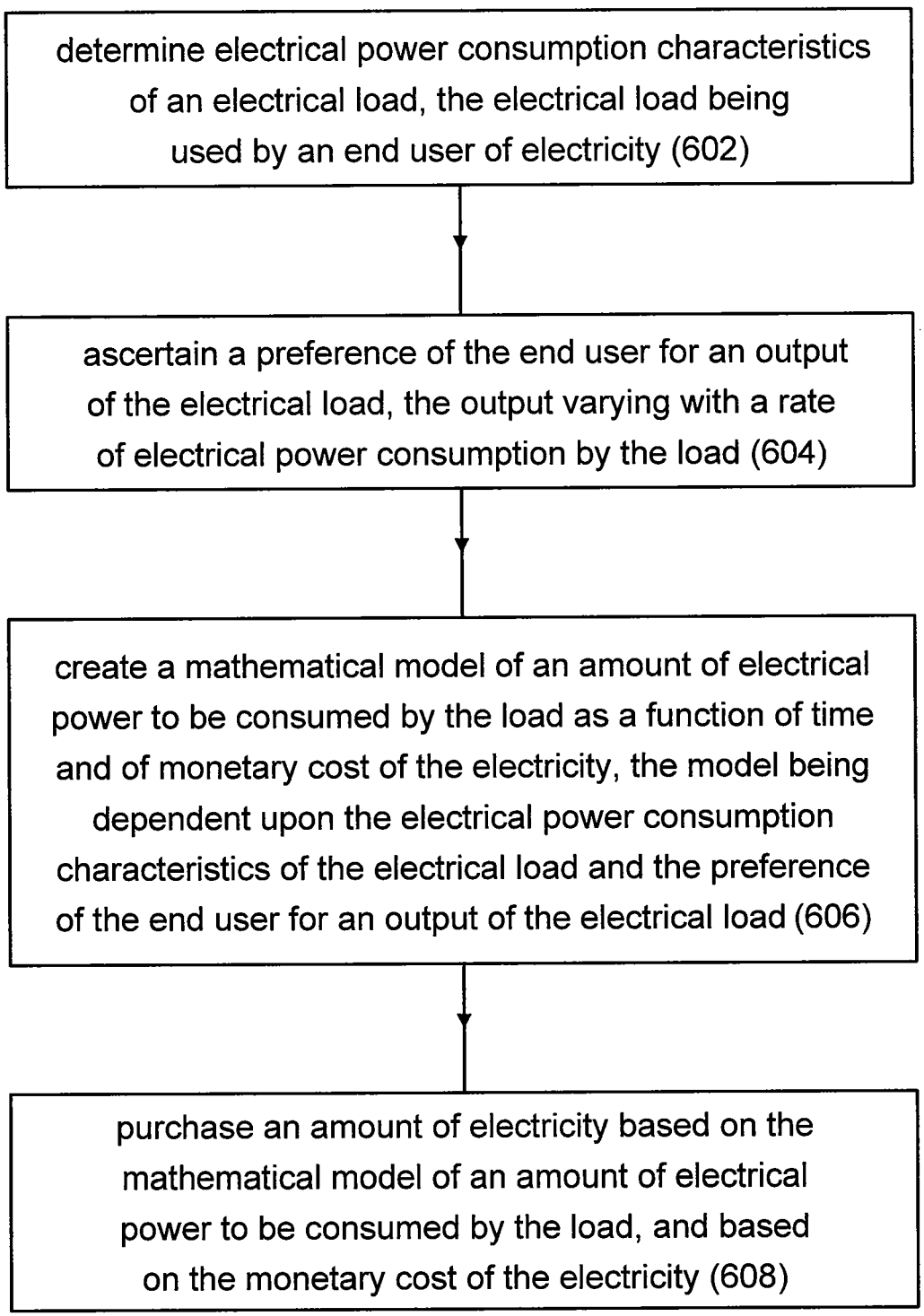
FIG. 6 is a flow chart of one embodiment of a method of the present invention for determining an amount of electricity to purchase.

In FIG. 6, there is shown one embodiment of a method 600 of the present invention for determining an amount of electricity to purchase. In a first step 602, electrical power consumption characteristics of an electrical load are determined. The electrical load is used by an end user of the electricity. For example, various types of sensors may be provided on premises, such as motion sensors, temperature sensors, humidity sensors, lighting sensors, and sensors to measure electricity consumption. Electricity consumption sensors may be directly connected to individual loads on the premises in order to detect the electricity consumption of individual devices. Such electricity consumption sensors may also measure aggregated electrical information, such as from the main electrical feed to the premises or at the circuit level. Data regarding the use of individual appliance may be obtained from aggregate sensor information via a non-intrusive load monitoring system, such as shown in FIG. 2. Sensors may also sense the state or position of user controls for the electrical loads. For instance, sensors may detect the set temperature of a thermostat, and such set temperature data may be recorded in correspondence to measured electrical consumption of the corresponding HVAC system. In another instance, sensors may detect the operating speed of a piece of machinery, and such operating speed data may be recorded in correspondence to measured electrical consumption of the corresponding piece of machinery. All of the sensor data may be processed to thereby ascertain patterns in electricity use and to construct a model of electricity consumption behavior for the premises which can be input to the local module.

The above-described sensors may collect electricity consumption data from individual appliances, machines, devices, and electrical systems. Alternatively, the sensors may collect data regarding the total electricity consumption on the premises, and this data may be recorded in conjunction with corresponding environmental sensor data regarding machine settings provided by the user, performance of the machines, temperatures and other environmental conditions on the premises that may affect electricity consumption. The data may also be time-stamped such that times of peak and lowest electricity consumption may be identified.

In addition to the electrical power consumption characteristics that are empirically measured by the inventive system as described above, electrical power consumption characteristic data associated with the individual machines, appliances, devices, etc. on the premises (e.g., a robotic system) may be obtained from the manufacturers of the apparatuses or from a third party data provider. Such electrical performance specifications may be automatically obtained via the internet. Other pertinent data may be obtained from remote sources, such as past weather condition data from a web site of the National Weather Service.

In a next step 604, a preference of the end user for an output of the electrical load is ascertained. The output varies with a rate of electrical power consumption by the load. As one example, the set temperatures that a user inputs into a thermostat through multiple day-long cycles may be recorded. Also recorded may be the power consumption of the HVAC system corresponding to the set temperature variations. Other pertinent data that may affect the electrical power consumption by the load may be recorded in conjunction with the other data. For example, ambient weather conditions may be recorded in conjunction with the data regarding the power consumption of the HVAC system and the user set temperatures.

Behavioral patterns of the end user may be learned from the available sensor data, and these patterns may indicate one or more preferences of the end user. Additional end user preference data may be obtained directly from manual or oral inputs from the end user via a user interface on the premises, such as an internet portal, a smart phone, a thermostat, or a personal electronic device. Examples of relevant end user preference information may be a machine speed and/or output force as preferred by a human factory manager.

Next, in step 606, a mathematical model of an amount of electrical power to be consumed by the load as a function of time and of monetary cost of the electricity is created. The model is dependent upon the electrical power consumption characteristics of the electrical load and the preference of the end user for an output of the electrical load. For example, in one embodiment, from the above-described inputs (electrical power consumption characteristics of the electrical apparatuses and the preference of the end user for outputs of the electrical apparatuses) along with market pricing information from the utility company or a commodity exchange, relevant load models may be derived through pattern detection algorithms, for example. As described above, electrical power consumption characteristics of the electrical apparatuses and the preference of the end user for outputs of the electrical apparatuses may be obtained or derived by analysis of the available sensor data. The mathematical model may be in the form of an optimal demand function that minimizes the cost of electricity to be purchased by the end user while still staying within the ranges or limits of the end user's preferred outputs of the electrical apparatuses. One simple example of such an optimization is a scenario wherein the load model is for a machine in a factory, and the end user preferences are the maximum and minimum machine speeds. The optimization problem may be where $S_i[k+1]=A_iS_i[k]+B_ix_i[k]$ subject to $S_1^{min} \leq S_i[h] \leq S_i^{max}$ for all h. Here, S is the speed of the machine, A and B parameterize a linear system model of the speed dynamics, x is energy consumed, h is the price of electricity, and k is a time interval (e.g., seconds).

The result of this optimization is a function x(h) that specifies the amount of energy the end user desires to purchase at price h for a particular time of the day. Such an optimization may be readily extended to other load models that are derived from the sensing information and corresponding preferences. The speed dynamics may be replaced with dynamics of the load behavior such as dynamics characterizing the work piece or substance that the machine is operating on. For example, a slow hardening of a liquid that a machine is working on (e.g., stirring) may result in the machine using more power as the liquid hardens. Such dynamics may be time dependent to reflect changes in the work piece or substance with time.

In a final step 608, an amount of electricity is purchased based on the mathematical model of an amount of electrical power to be consumed by the load, and based on the monetary cost of the electricity. For example, the mathematical model may specify an optimal amount of electrical energy that should be purchased during a particular time period as a function of the cost of electricity. It is possible that the actual cost of the electricity is not known with precision until the electricity is actually bought or bid for. In this case, the actual price of the electricity may be input into the mathematical model, and the model may output an optimal amount of electrical energy to purchase at that particular known price As one example, an electric vehicle may be re-charged over night while the end user sleeps. Data regarding the end user's driving needs the following day may be ascertained through pattern recognition or via direct user input. An amount of electricity to re-charge the vehicle may be purchased dependent upon the cost of the electricity on that particular night, or on an hour-by-hour basis. For instance, the user may specify his preference that if the cost of electricity is above a threshold price, then he wants enough electricity that there is 95% certainty that he can get through the following day without recharging away from home; and if the cost of electricity is below the threshold price, then he wants enough electricity that there is 99% certainty that he can get through the following day without recharging away from home.

If the price of the electricity changes on an hour-by-hour basis, the user may specify that the rate of electrical recharging be inversely related to the price of electricity early in the available time period for recharging (e.g., early being 10 p.m. to 11 p.m. during an available re-charging time period extending from 10 p.m. to 6 a.m). For example, during this 10-11 p.m. hour, recharging may be performed at 6 kilowatts if the electricity cost is in the lowest 20th percentile of historic costs, but recharging may be performed at only 1 kilowatt if the electricity cost is in the highest 20th percentile. Recharging may be performed at 3 kilowatts at any other cost. In contrast, if it is 5 a.m. (i.e., the final 5 a.m. to 6 a.m. recharging period is beginning), and the vehicle has still not been fully charged, or has not been charged to an acceptable level, then recharging may be performed at the maximum rate of 6 kilowatts regardless of the cost of electricity at that hour. The amount of electricity to be purchased at a given price may increase throughout the night as the need to re-charge to an acceptable level gets more urgent closer to the end of the 10 p.m. to 6 a.m. re-charging window.

Figure 7:
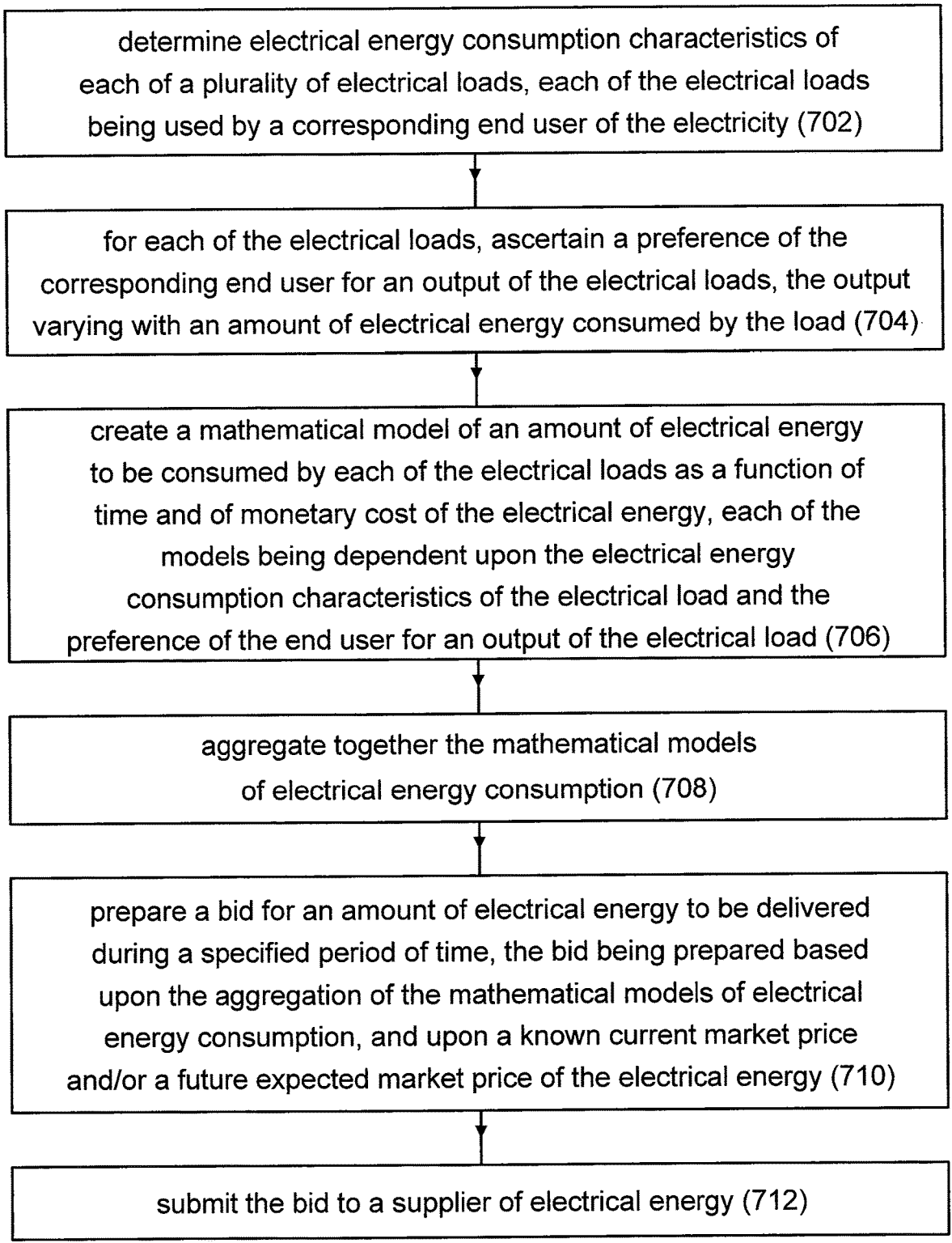
FIG. 7 is a flow chart of one embodiment of a method of the present invention for distributing electricity among a plurality of end users.

In FIG. 7, there is shown one embodiment of a method 700 of the present invention for distributing electricity among a plurality of end users. In a first step 702, electrical energy consumption characteristics of each of a plurality of electrical loads are determined Each of the electrical loads is used by a corresponding one of the end users of the electricity. For example, sensors may detect human motion, environmental conditions such as temperature, humidity, and light levels, and electricity consumption by each and/or all of the electrical loads together. Electricity consumption sensors may be placed in association with individual loads on the premises in order to detect the electricity consumption of the individual devices. The sensor may measure the electricity consumption directly, or the sensors may measure the electricity consumption indirectly, such as inductively. Aggregated electrical information may also be measured, such as from the main electrical feed to the premises or by summing the electricity consumption of all of the individual loads. Data regarding the electricity of individual appliances may be obtained via ammeters and voltmeters, such as shown in FIG. 2. The state or position of user controls for the electrical loads may also be known by the control electronics, and this information may be provided to the inventive system. For instance, re-charging parameters for each of a plurality of vehicle recharging stations may be known by a central recharging controller, and such electrical re-charging parameters may be recorded in correspondence to measured electrical consumption of each of the re-charging stations. In another instance, dryness settings (e.g., damp, normal dry, more dry) for each of a plurality of dryers operating in a Laundromat may be known by a central controller, and such dryness settings may be recorded in correspondence to measured electrical consumption of the individual dryers. All of the sensor data may be processed to thereby ascertain patterns in electricity use and to construct a model of electricity consumption behavior for the premises which can be input to the local module.

The above-described sensors and/or central digital controllers may collect electricity consumption data regarding individual appliances, machines, devices, and electrical systems. Alternatively, the sensors and/or central digital controllers may collect data regarding the total electricity consumption on the premises, and this data may be recorded in conjunction with corresponding environmental sensor data regarding machine settings provided by the user, performance of the machines, temperatures, humidity, wind speed and other environmental conditions on the premises that may affect electricity consumption. The data may also be time-stamped such that times of peak and lowest electricity consumption may be identified, and repeating cycles in the electricity consumption may be identified.

In addition to the electrical power consumption characteristics that are empirically measured by the inventive system as described above, electrical power consumption characteristic data associated with the individual machines, appliances, devices, etc. on the premises (e.g., vehicle recharging stations) may be obtained from a central database that automatically collects historic electrical power consumption characteristic data for the apparatuses via the internet. Such electrical power consumption characteristic data may be automatically measured at various geographically dispersed locations for similar apparatus models, such that electricity consumption data from a large number of similar apparatuses may be leveraged to benefit each of the individual apparatuses.

In a next step 704, for each of the electrical loads, a preference of the corresponding end user for an output of the electrical loads is ascertained. The output varies with an amount of electrical energy consumed by the load. As one example, the dryness settings that corresponding users input into a group of clothes dryers may be recorded. Also recorded may be the power consumption of each of the individual dryers corresponding to the dryness settings. Other pertinent data that may affect the electrical power consumption by the load may be recorded in conjunction with the other data. For example, weights of the clothes in each individual dryer may be recorded in conjunction with the data regarding the power consumption of the dryers and the users' preferred dryness settings.

Behavioral patterns of previous groups of end user may be learned from historic recorded data, and these patterns may indicate one or more preferences of the end user. For instance, historic data may show that a certain percentage of users turn off the dryer and remove their clothes before the clothes have reached the set dryness condition. Additional end user preference data may be obtained directly from manual or oral inputs from the end user via a user interface on the premises, such as an internet portal, a smart phone, a kiosk, user interfaces on the dryers, or a personal electronic device. Examples of relevant end user preference information manually or orally provided by users may include whether the actual dryness of their clothes is wetter or dryer than the setting the users requested. Amounts of electrical energy purchased in the future may then be compensated for the feedback thus provided by the users as to whether the previously purchased amounts of electrical energy were insufficient or more than sufficient to achieve the users' desired dryness settings.

Next, in step 706, a mathematical model of an amount of electrical energy to be consumed by each of the electrical loads as a function of time and of monetary cost of the electrical energy is created. Each of the models is dependent upon the electrical energy consumption characteristics of the electrical loads and the preference of the end user for an output of the electrical loads. In one embodiment, from the above-described inputs (electrical power consumption as a function of time and of the end user's desired output of the electrical apparatuses) along with a known pricing schedule for the electricity, relevant load models may be derived with the benefit of analysis of historical electricity usage patterns, for example.

As described above, electrical power consumption functions of the electrical apparatuses and the end user's preferred outputs of the electrical apparatuses may be obtained or derived by analysis of the available current and historical sensor data. In one embodiment, the mathematical model may be in the form of an optimal demand function that determines an amount of electricity to be purchased by the end user that achieves the best trade-off between the monetary cost of the electricity and the end user's varying satisfaction (e.g., utility) from each level of output of the electrical apparatuses. One simple example of such an optimization is a scenario wherein the load models are for a fleet of clothes dryers in a Laundromat, and the end user preferences are desired levels of dryness for the batches (i.e., loads) of clothing. Each level of dryness may correspond to a maximum and minimum percentage reduction in weight of the batches of clothing during the drying process. Each clothes dryer may have a built-in scale for weighing the batch of clothes inside the dryer. The optimization problem may be where $W_i[k+1]=A_iW_i[k]-B_ix_i[k]$ subject to $W_i^{min} \leq W_i[h] \leq W_i^{max}$ for all h. Here, W is the weight of the batch of clothes, A and B parameterize a linear system model of the drying dynamics, x is energy consumed, h is the price of electricity, and k is a time interval (e.g., minutes).

The mathematical model of an amount of electrical energy to be consumed by a particular electrical load may be dependent upon the amount of electrical energy to be consumed by one or more other electrical loads. For example, in the case of a Laundromat, the amount of electricity needed by the HVAC system load to heat the Laundromat itself may be dependent upon how much excess heat is produced by the clothes dryers and released into the ambient environment. A table in memory may equate an amount of electricity that can be saved in running the HVAC with a number of clothes dryers operating; particular heat settings of the dryers; clothing weights in each of the dryers; times at which the dryers are each scheduled to complete the drying cycle and release excess heat upon opening of the dryer door; and even locations of the running dryers within the Laundromat.

In step 708, the mathematical models of electrical energy consumption are aggregated together. As described above, a respective mathematical optimization model may be performed for each dryer in the Laundromat, and these optimizations may be aggregated (e.g., summed together). The result of this summed optimization may be a function x.sub.total(h) that specifies the amount of energy the end user desires to purchase at price h for a particular time of the day. Such an optimization may be readily extended to other load models that are derived from the sensing information and corresponding preferences. The weight dynamics may be extended to reflect the interaction between the changing weight of the batch and the amount of electricity needed to dry the clothes. For example, greater power may be needed to rotate the clothes in the dryer at the beginning of the drying cycle when the clothes are heavier, and this level of power for turning the clothes may slowly decrease as the clothes dry and become lighter. Thus, such dynamics may be time dependent to reflect changes in the weight of the clothes with time.

In a next step 710, a bid is prepared for an amount of electrical energy to be delivered during a specified period of time. The bid is prepared based upon the aggregation of the mathematical models of electrical energy consumption, and upon a known current market price and/or a future expected market price of the electrical energy. For example, the aggregation of the mathematical models may specify an optimal amount of electrical energy that should be purchased during a particular time period as a function of a current cost of electricity and/or an expected future cost of electricity. It is possible that the actual cost of the electricity is not known with precision until the electricity is actually bought or a bid is accepted. In this case, the actual price of the electricity may be input into the mathematical models, and the aggregation of the models may output an optimal amount of electrical energy to purchase at that particular known price.

The bidding process may be iterative wherein the system submits a bid for a certain amount of electricity at a certain price, and, if the bid is rejected, the system continues to re-submit bids until one of the bids is accepted. Alternatively, the system may submit a bid in the form of an amount of electricity that the system commits to purchase at each of a range of possible unit prices for the electricity.

As one example, a Laundromat may be able to purchase or otherwise obtain electricity from a variety of sources. For example, the Laundromat may be able to selectively purchase electricity from a number of utilities, the Laundromat may be able to provide its own electricity internally such as from solar collectors, generators, and/or storage devices for storing such internally-generated electricity, and/or the Laundromat may be able to purchase excess electricity from other businesses who may internally produce more electricity than they need.

The amount of electricity needed by the Laundromat in the next couple of hours may be ascertained from the aggregation of the electricity consumption models for each of the dryers. These individual models may be dependent upon a dryness setting selected by the user as well as a weight of the clothes in the batch. In one embodiment, the weight of the dry clothes as put into and measured by the washing machine is subtracted from the weight of the wet clothes as put into the dryer to thereby ascertain a total water weight, or percentage water weight, of the clothes put into the dryer. Thus, the amount of electricity needed, as reflected in the model, may depend upon the total water weight, or percentage water weight, of the clothes put into the dryer. An amount of electricity to operate the fleet of dryers may be purchased dependent upon both the cost of the electricity at that particular time, or on an hour-by-hour basis, and the availability and cost of electricity from other internal and external sources. For instance, the user may specify to the system his preference that if the cost of electricity is above a threshold price, then he wants to use all of the electricity that he can internally produce, and purchase as little electricity as necessary to operate the dryers. Conversely, if the cost of electricity is below the threshold price, then the user may specify that he wants to purchase as much electricity as is necessary to operate the dryers, and he will not internally produce electricity. The user may then store whatever electricity that is internally collected.

If the price of the electricity changes on an hour-by-hour basis, the user may internally produce some electricity with a distributed generator and store this electricity as backup in case the price of electricity exceeds the threshold price some time within the next several hours. The system may assume that the closer the present price of electricity is to the threshold price, the more likely it is that the price within the next several hours will exceed the threshold price. If the price does happen to rise above the threshold price, then it may be desirable to have a backup supply of electricity stored, or to have bought an option to purchase the electricity from another source. Thus, the user may specify that the rate of internal electricity production and storage, and/or whether options to purchase electricity from other providers are bought by the user from the other providers or on the open market, be related to the current price of electricity relative to the threshold price.

In determining the degree to which the system should make arrangements for obtaining electricity from a backup source, the system may also take into account any trend there is in the current price of electricity and extrapolate the trend. Alternatively, or in addition, the system may take into account historic trends in the price of electricity during that particular period of the day, on that particular day of the week, season of the year, etc.

In a final step 712, the bid is submitted to a supplier of electrical energy. For example, the system may automatically and electronically submit its bid for electricity to the utility company or to some go-between party that manages and responds to such bids.

Figure 8:
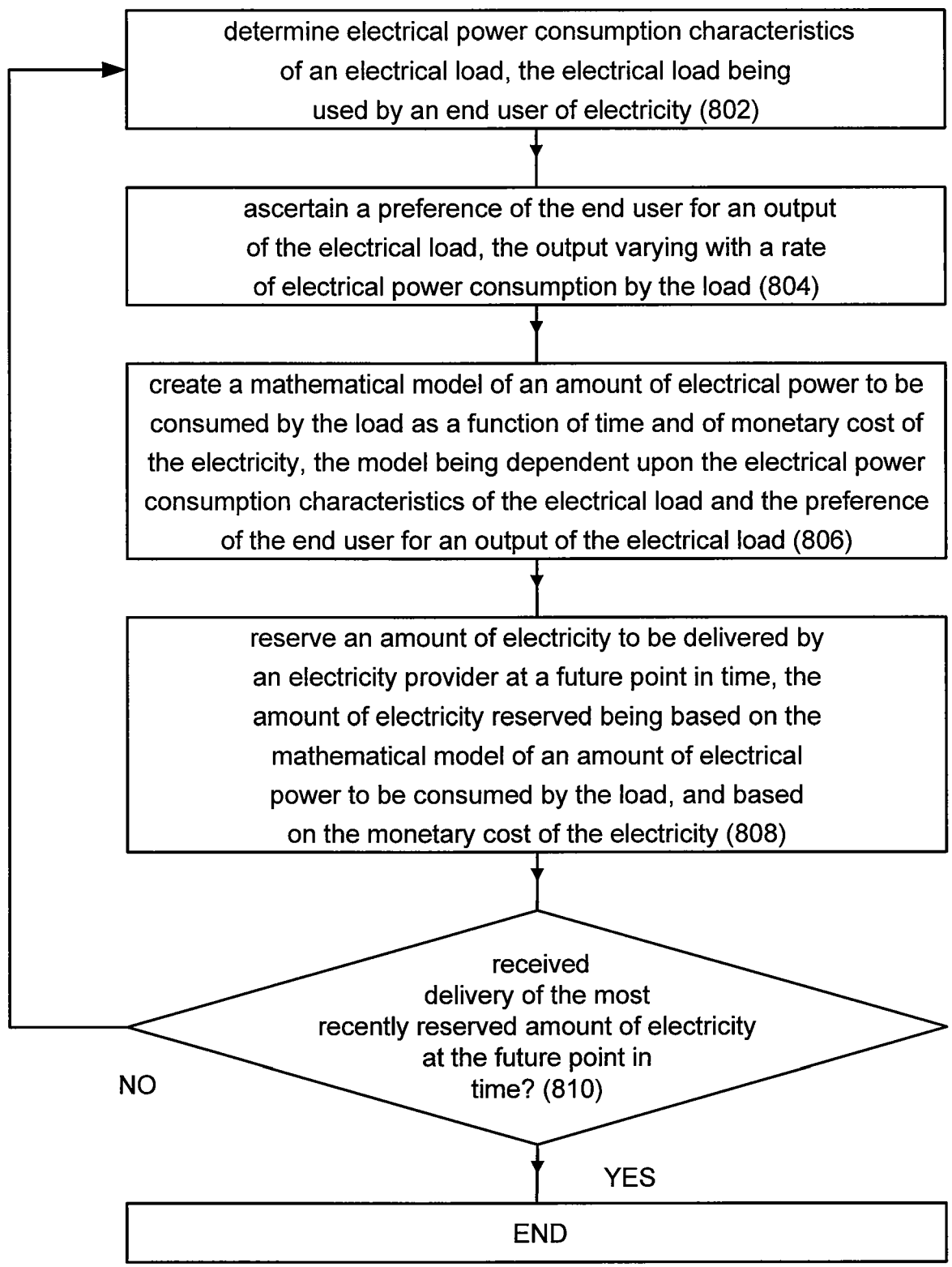
FIG. 8 is a flow chart of another embodiment of a method of the present invention for determining an amount of electricity to purchase.

In FIG. 8, there is shown another embodiment of a method 800 of the present invention for determining an amount of electricity to purchase. In a first step 802, electrical power consumption characteristics of an electrical load are determined. The electrical load is used by an end user of the electricity. In the specific example, the electrical load maintains a temperature of a thermal body such as a water heater, a building, or a swimming pool. Sensors such as temperature sensors may be provided in association with the thermal body. Electricity consumption sensors may be directly connected to the individual loads, such as resistance heaters or air conditioning units, in order to detect the electricity consumption of the resistance heaters or air conditioning units. Such electricity consumption sensors may also measure aggregated electrical information, such as from the main electrical feed to the premises or at the circuit level. Data regarding the use of individual appliance may be obtained from aggregate sensor information via a non-intrusive load monitoring system, such as shown in FIG. 2. Sensors may also sense the state or position of user controls for the electrical loads. For instance, sensors may detect the set temperature of a thermostat, and such set temperature data may be recorded in correspondence to measured electrical consumption of the corresponding resistance heaters or air conditioning units. All of the sensor data may be processed to thereby ascertain patterns in electricity use and to construct a model of electricity consumption behavior for the resistance heaters or air conditioning units, which can be input to the local module.

In addition to the electrical power consumption characteristics that are empirically measured by the inventive system as described above, electrical power consumption characteristic data associated with the individual the resistance heaters or air conditioning units may be obtained from the manufacturers of the apparatuses or from a third party data provider. Such electrical performance specifications may be automatically obtained via the internet. Other pertinent data may be obtained from remote sources, such as past weather condition data from a web site of the National Weather Service.

In a next step 804, a preference of the end user for an output of the electrical load is ascertained. The output varies with a rate of electrical power consumption by the load. As one example, the set temperatures that a user inputs into a thermostat through multiple day-long cycles may be recorded. Also recorded may be the power consumption of the resistance heaters or air conditioning units corresponding to the set temperature variations. Other pertinent data that may affect the electrical power consumption by the load may be recorded in conjunction with the other data. For example, ambient weather conditions may be recorded in conjunction with the data regarding the power consumption of the resistance heaters or air conditioning units and the user set temperatures.

Behavioral patterns of the end user may be learned from the available sensor data, and these patterns may indicate one or more preferences of the end user. Additional end user preference data may be obtained directly from manual or oral inputs from the end user via a user interface on the premises, such as an internet portal, a smart phone, a thermostat, or a personal electronic device. Examples of relevant end user preference information may be air temperature or water temperature. These temperature preferences may vary according to a user-specified time schedule.

Next, in step 806, a mathematical model of an amount of electrical power to be consumed by the load as a function of time and of monetary cost of the electricity is created. The model is dependent upon the electrical power consumption characteristics of the electrical load and the preference of the end user for an output of the electrical load. For example, in one embodiment, from the above-described inputs (electrical power consumption characteristics of the resistance heaters or air conditioning units and the preference of the end user for air temperature or water temperatures) along with market pricing information from the utility company or a commodity exchange, relevant load models may be derived through pattern detection algorithms, for example. As described above, electrical power consumption characteristics of the resistance heaters or air conditioning units and the preference of the end user for air and/or water temperatures may be obtained or derived by analysis of the available sensor data. The mathematical model may be in the form of an optimal demand function that minimizes the cost of electricity to be purchased by the end user while still staying within the ranges or limits of the end user's preferred air/water temperatures. One simple example of such an optimization is a scenario wherein the load model is for resistance heaters or air conditioning units, and the end user preferences are the maximum and minimum air/water temperatures. The optimization problem may be where $T_i[k+1]=A_iT_i[k]+B_ix_i[k]$ subject to $T_i^{min} \leq T_i[h] \leq T_i^{max}$ for all h. Here, T is the air/water temperature, A and B parameterize a linear system model of the speed dynamics, x is energy consumed, h is the price of electricity, and k is a time interval (e.g., seconds).

The result of this optimization is a function x(h) that specifies the amount of energy the end user desires to purchase at price h for a particular time of the day. Such an optimization may be readily extended to other load models that are derived from the sensing information and corresponding preferences.

In step 808, an amount of electricity is reserved based on the mathematical model of an amount of electrical power to be consumed by the load, and based on the monetary cost of the electricity. For example, the mathematical model may specify an optimal amount of electrical energy that should be reserved during a particular time period as a function of the cost of electricity. As used herein, "reserve" or "reserved" may mean informing a provider of electricity of the user's forecasted need for a certain amount of electricity at a certain time or time period so that the electricity provider may make arrangements to be able to provide the requested amount of electricity at the requested time. Reserving electricity may or may not involve a legal obligation to buy the electricity. It is possible that the actual cost of the electricity is not known with precision until the electricity is actually bought or delivered. In this case, the actual price of the electricity may be input into the mathematical model, and the model may output an optimal amount of electrical energy to reserve at that particular known price.

As one example, an electric water heater of an apartment building may need to provide large volumes of electricity starting at 6 a.m. on weekdays, but may need to provide much smaller amounts between midnight and 6 a.m. Data regarding the building occupants' hot water needs the following day may be ascertained through pattern recognition or via direct user input. An amount of electricity to heat the water may be purchased dependent upon the cost of the electricity on that particular night, or on an hour-by-hour basis.

Next, in step 810, it is determined whether the most recently reserved amount of electricity has been delivered to the user. In the above example, the amount of reserved electricity may be delivered beginning at 6 a.m. Before the reserved amount of electricity has actually been delivered, the system may periodically update or adjust the amount of electricity that is reserved. For example, the desired amount of electricity may be first reserved at 1 a.m. based on steps 802-808. However, new input data received after the initial reservation may change how much electricity the user wants to reserve. Such new input data may result from the system sensing a change in the number of residents present in the building and likely to want hot water in the morning. Thus, if the electricity has not yet been actually delivered (e.g., it is not yet 6 a.m.), then steps 802-808 may be periodically repeated to ensure that the amount of electricity reserved is based on the most recent input data. In one embodiment, steps 802-808 may be repeated hourly (e.g., at 2 a.m., 3 a.m., 4 a.m. and 5 a.m.).

While this invention has been described as having an exemplary design, the present invention may be further modified within the spirit and scope of this disclosure. This application is therefore intended to cover any variations, uses, or adaptations of the invention using its general principles.

What is claimed is:

1. An adaptive load management system for a plurality of buildings comprising:
   a plurality of electric loads, the plurality of electric loads including at least one electric load in each of the buildings;
   a plurality of sensors, the plurality of sensors having at least one sensor positioned in each of the buildings, each sensor being configured to identify at least one of an environmental condition and an activity in a corresponding building of the plurality of buildings that is indicative of a usage pattern for the at least one electric load of the corresponding building;
   an electricity generation source configured to supply at least a portion of electric power consumed by the at least one electric load of a first building of the plurality of buildings;
   a plurality of local modules, the plurality of local modules including at a local module in each of the buildings, each local module having a processor, a memory, and a user interface device and being operatively connected to the at least one sensor of the corresponding building, each of the local modules being configured to:
      receive sensor data from the at least one sensor of the corresponding building during operation of the at least one electric load of the corresponding building;
      identify the usage pattern of the at least one electric load of the corresponding building with reference to received sensor data;
      receive user preference data corresponding to the usage pattern of the electric load of the least one building via the user interface device; and
      determine, based on the usage pattern and the user preference data, a demand function that predicts an amount of electrical power consumption for the at least one electric load of the corresponding building as a function of time; and
   an aggregator module that is in communication with the plurality of local modules, the aggregator module being configured to:
      receive the demand function from each of the local modules;
      determine an aggregated demand function by combining the demand functions received from each of the local modules, the aggregated demand function predicting a total amount of electrical power consumption for the plurality of electrical loads as a function of time; and
      transmit a bid to a supplier of electrical energy for the purchase of an amount of electrical energy to be delivered to the electrical loads during a specified period of time, the amount of electrical energy purchased being based on the aggregated demand function,
   wherein each local module of the plurality of local modules is configured to adjust operation of the at least one electric load of the corresponding building to minimize a real-time deviation from the amount of energy purchased,
   wherein the local module associated with the first building is operatively connected to the electricity source and is configured to adjust an output of the electricity generation source to minimize the real-time deviation from the amount of energy being purchased.

2. The adaptive load management system of claim 1, wherein at least one of the plurality sensors is a temperature sensor and the local module of the corresponding building is further configured to:
   receive temperature data from the temperature sensor corresponding to a temperature of a thermal body that is temperature controlled by the at least one electric load of the corresponding building; and
   identify the usage pattern with reference to the temperature data.

3. The adaptive load management system of claim 1, wherein at least one electric load of the plurality of electric loads is a water heater and the local module of the corresponding building is further configured to:
   predict an amount of electrical power consumption for the water heater with reference to an optimization model corresponding to a water temperature in the water heater and an amount of electricity that is consumed to adjust the temperature of water in the water heater.

4. The adaptive load management system of claim 1, wherein at least one electric load of the plurality of electric loads is a heater/air conditioner and the local module of the corresponding building is further configured to:
   predict an amount of electrical power consumption for the heater/air conditioner with reference to an optimization model corresponding to an air temperature produced by the heater/air conditioner and an amount of electricity that is consumed to adjust the air temperature.

5. The adaptive load management system of claim 1, wherein at least one electric load of the plurality of electric loads is a heater/air conditioner and the local module of the corresponding building is further configured to:
   predict an amount of excess heat produced by the power generation system; and
   predict an amount of electrical power consumption for the heater/air conditioner with reference to the predicted amount of excess heat produced by the power generation system.

6. The adaptive load management system of claim 1, wherein at least one of the plurality sensors is configured to sense at least one of humidity, wind speed, motion, and lighting of the corresponding building.

7. The adaptive load management system of claim 1, wherein:
   the user preference data includes at least one of a range and a limit for the output of the at least one electric load of the corresponding building; and
   the demand function is configured to minimize a cost of electricity to be purchase while staying within the at least one of the range and the limit for the output of the at least one electric load of the corresponding building.

* * * * *